United States Patent
Boussaad

(10) Patent No.: US 8,039,527 B2
(45) Date of Patent: Oct. 18, 2011

(54) POLYMERS CONTAINING HEXAGONAL BORON NITRIDE PARTICLES COATED WITH TURBOSTRATIC CARBON AND PROCESS FOR PREPARING SAME

(75) Inventor: Salah Boussaad, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/993,178

(22) PCT Filed: Jun. 8, 2009

(86) PCT No.: PCT/US2009/046592
§ 371 (c)(1), (2), (4) Date: Nov. 17, 2010

(87) PCT Pub. No.: WO2009/149445
PCT Pub. Date: Dec. 10, 2009

(65) Prior Publication Data
US 2011/0065853 A1    Mar. 17, 2011

Related U.S. Application Data

(60) Provisional application No. 61/131,196, filed on Jun. 6, 2008.

(51) Int. Cl.
C08K 9/10    (2006.01)

(52) U.S. Cl. .......... 523/210; 523/215; 428/403
(58) Field of Classification Search .......... 523/210, 523/215; 428/403
See application file for complete search history.

(56) References Cited

U.S. PATENT DOCUMENTS

| | | | | |
|---|---|---|---|---|
| 3,799,790 A * | 3/1974 | Schulz et al. | | 427/6 |
| 4,013,760 A * | 3/1977 | Huschka et al. | | 423/453 |
| 4,796,701 A * | 1/1989 | Hudson et al. | | 166/278 |
| 5,536,292 A * | 7/1996 | Holcombe et al. | | 65/23 |
| 6,620,497 B2 * | 9/2003 | Smith et al. | | 428/323 |
| 2002/0160196 A1 * | 10/2002 | Carr et al. | | 428/407 |
| 2009/0304922 A1 * | 12/2009 | Boussaad | | 427/215 |
| 2009/0306248 A1 * | 12/2009 | Boussaad | | 523/215 |
| 2010/0310861 A1 * | 12/2010 | Boussaad | | 428/336 |

FOREIGN PATENT DOCUMENTS

| | | |
|---|---|---|
| JP | 169192 A | 6/1990 |
| JP | 2887174 B2 | 4/1999 |

OTHER PUBLICATIONS

M. S. Dresselhaus et al., Graphite Fibers and Filaments, Springer-Verlag (1988), pp. 42-48 and 51-55.

* cited by examiner

Primary Examiner — Vickey Nerangis

(57) ABSTRACT

The present invention describes polymer compositions containing boron nitride particles that are encapsulated in layers of turbostratic carbon. The polymers so prepared exhibit enhanced thermal conductivity.

15 Claims, 3 Drawing Sheets

Turbostratic
Carbon

POLYMERS CONTAINING HEXAGONAL BORON NITRIDE PARTICLES COATED WITH TURBOSTRATIC CARBON AND PROCESS FOR PREPARING SAME

FIELD OF THE INVENTION

The present invention is directed to novel polymer compositions containing boron nitride particles that are encapsulated in layers of turbostratic carbon. The polymers so prepared exhibit enhanced thermal conductivity.

BACKGROUND OF THE INVENTION

Sugiyama et al., JP2887874, discloses coating boron nitride (BN) particles 100 micrometers (μm) in diameter with colloidal graphite particles of a size less than 5 μm in diameter by immersing the BN into an aqueous colloidal suspension of the graphite, followed by drying at up to 300° C.

Kenji et al., J P Hei 2[1990]-169192, discloses applying a graphite coating to a sintered body of cubic BN. A dispersion of 1-3 μm graphite powders in ethanol is sprayed onto the surface of the sintered body. The thus coated surface is said to be more absorbing of laser radiation, facilitating cutting of the sintered body.

Turbostratic carbon is a form of carbon that, like graphite, forms platelet structures and is highly ordered in the plane of the platelet, but, unlike graphite, shows no organization between platelets—that is in the direction normal to the plane of the platelet. Turbostratic carbon and methods for the formation thereof are described in detail in *Graphite Fibers and Filaments*, M. S. Dresselhaus et al., Springer-Verlag (1988), pp. 42-48 and 51-55.

Polymers, including polymers filled with inorganic, non-electrically conductive particulate matter, have found widespread commercial use as dielectric or insulating materials such as in wire and cable, printed circuits, including flexible printed circuits, and including multi-layer printed circuits. In applications where power levels generate significant heat, improvement in thermal management can be derived from polymeric materials exhibiting increased thermal conductivity.

SUMMARY OF THE INVENTION

The present invention provides a polymeric composite composition comprising a polymer having dispersed therein a loading of particles of hexagonal boron nitride having a coating of turbostratic carbon.

The present invention further provides a process for making a composition comprising a polyimide having dispersed therein a loading of particles of hexagonal boron nitride having a coating of turbostratic carbon, the process comprising dispersing in a solution of a polyamic acid in an organic solvent particles of hexagonal boron nitride having a coating of turbostratic carbon, casting a film therefrom, extracting said organic solvent, and imidizing said polyamic acid in said film.

BRIEF DESCRIPTION OF THE DRAWING

The Drawing consists of six figures.

DETAILED DESCRIPTION

Figure 1:
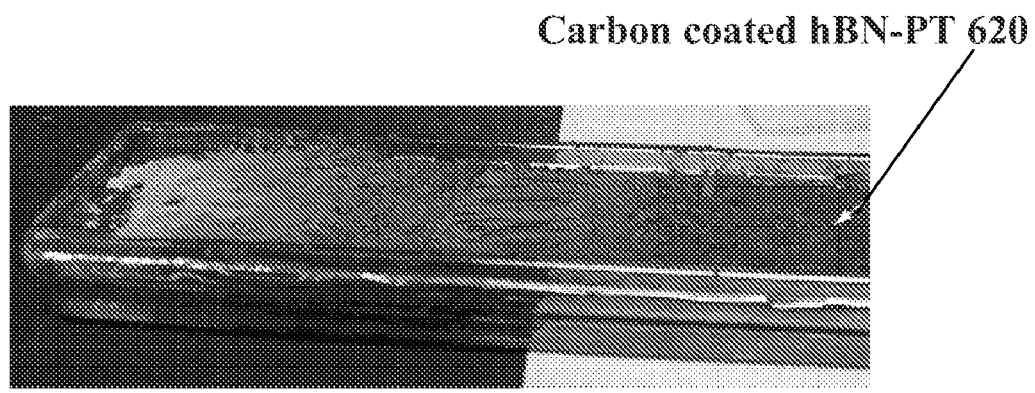
FIG. 1 is a photograph of turbostratic carbon-coated hBN particles lying in a layer in a quartz boat.

Hexagonal BN (hBN) is known in the art to exist in the form of platelets. A particle of hBN is formed by the layering of a plurality of hBN platelets thereby forming a sheet-like structure having a characteristic planar morphology and a thickness normal to the plane, and wherein the in-plane dimensions exceed the normal dimensions by ca. 10× or greater. For the purposes of the present invention, hBN particles suitable for use are characterized by the thickness of the particle and the maximum dimension in the plane thereof. Suitable for use in the present invention are hexagonal (hBN) particles ranging in thickness from 0.1 to 5 micrometers (μm), and ranging in maximum in-plane dimension from 1 to 200 μm. These dimensions are estimates based upon examination of scanning electron micrographs of the particles employed. The operability of the present invention does not depend critically upon the particular average dimensions of the hBN particles. While not expressly determined, there is no reason why hBN particles outside the stated range of particle sizes would not also be operable herein.

For the purposes of the present invention, the term "turbostratic carbon" shall be understood to refer to a crystalline carbon forming a lamellar structure whereof the basal planes have slipped sideways to one another, causing the spacing of the planes be greater than would be obtained in a graphitic structure.

The turbostratic carbon layers formed according to the process described below are ca. 1 nm in thickness. The encapsulating coating disposed upon the hBN typically comprises a plurality of said turbostratic carbon layers. The thicknesses of coatings useful in the practice of the present invention range from 5 to 5000 nm. The coating thickness can be made to increase with increasing time of exposure to a reactant gas composition, or by increasing the concentration of hydrogen during formation of the coating. The encapsulated hBN disclosed herein is further characterized by an encapsulating sheet about 5 nanometers (nm) to about 5000 nm in thickness, comprising a plurality of layers of turbostratic carbon. The sheet adheres to the surface of the hBN, and closely follows the topography of the hBN particle.

The encapsulated hBN particles suitable for use in the present invention are useful as fillers for polymeric materials when an increase in polymeric thermal conductivity is desired. Thermal conductivity in polymer films in a direction normal to the plane of the film is well-known in the art to be quite low, in many cases more than an order of magnitude lower than in the plane of the film, making polymers quite useful as thermal insulators. However, that same insulating property can be detrimental to the utility of a polymer film where thermal insulation is undesirable. Very significant enhancement has been found in thermal conductivity normal to the plane of polymer films containing loadings ranging from ca. 10 weight-% to ca. 60 weight-% of the encapsulated hBN suitable for use herein.

The turbostratic carbon-encapsulated hBN suitable for use herein may be prepared by exposing hBN having a platelet morphology characterized by a thickness in the range of 0.1 to 5 micrometers and a maximum in-plane dimension of 1 to 200 micrometers to a gas phase mixture of hydrogen, at least one alkane, and at least one alkene at a temperature in the range of 850-2000° C. for ca. 60 min to ca. 6 sec. In one embodiment, the temperature can range from 900-1200° C., and the exposure time can range from 6 min to 30 sec. At temperatures below 850° C. the coatings are not uniform.

The turbostratic carbon coating provides the same benefits as graphite as a coating for hBN, but can be produced under conditions of lower temperatures and shorter times than can graphite.

In one embodiment, the alkane is a fluid at room temperature. In one embodiment, the alkane is a gas at room temperature. In a further embodiment, the alkane is methane.

In another embodiment, the alkene is a fluid at room temperature. In a further embodiment, the alkene is a gas at room temperature. In a further embodiment, the alkene is ethylene.

In one embodiment of the process for preparing the turbostratic carbon-coated hexagonal boron nitride suitable for use herein, hydrogen, methane, and ethylene are introduced as a reactant gas composition into a nitrogen purged furnace that has been pre-heated to 900° C. and containing a layer≦ca. 1 cm thick of hBN particles for a period of 1-6 minutes, after which the reaction gas flow is stopped and the nitrogen purge resumed as the furnace is cooled. It is found in the practice of the invention that when the reactant gas composition comprises all three reaction gases, the uniformity of the coating and control of coating thickness are improved. It is further found in the practice of the process hereof that the volumetric flow rate ratio of $H_2$ to $CH_4$ should be in the range of 1:1 to 2:1. At ratios below 1:1, the carbon coating may be amorphous. At ratios above 2:1 the carbon coating may not form a uniform coating. It is further found in the practice of the process hereof that the volumetric flow ratio of $CH_4$ to $C_2H_4$ should be at least 10:1, preferably at least 20:1. At ratios of less than 10:1 safety may be compromised by dangerous and uncontrolled pressure increases. $CH_4$ serves as an important moderator of the reaction from both a safety viewpoint and from a product uniformity viewpoint.

After cooling, the thus treated hBN particles are found to have changed from white to black, indicating the successful coating operation. The particles thus prepared can then be incorporated into polymers for the purpose of preparing a composite having a thermal conductivity higher than that of the corresponding neat polymer (that is, the polymer not containing the particles). In particular, it is found that the thermal conductivity normal to the plane of a polymeric film is improved several fold over that of the polymer itself.

The particular filler loading and method for forming the filled polymer will depend upon the specific properties of the polymer, and the requirements of the specific end use. It is well-known in the art of filled polymers that inorganic particulate fillers often cause some degradation in the properties of the neat polymer. For example, filled polymers are typically stiffer, more brittle, and less tough than the corresponding neat polymer. The turbostratic carbon-encapsulated hBN suitable for use herein may conveniently be melt blended with a thermoplastic polymer and then cast into films. Melt blending may be effected using milling, high intensity mixers, or twin screw extruders. It is often desirable to first create the filled polymer in pellet form and then cast films from the pellet form. Alternatively, the films may be cast directly from the blending operation without an intermediate pelletization step.

In one embodiment, the treated hBN suitable for use herein is dispersed in a solution of polyamic acid, the resulting solution/dispersion formed into a film, and the film imidized to form a hBN filled polyimide film. The polyimide employed maybe a homopolymer or a copolymer. In another embodiment, the polyimide so prepared is not in the shape of a film. For example, the polyimide filled with turbostratic carbon-coated hBN according to the invention hereof, can be in the form of stock shapes, such as, but not limited to, cylinders and prisms.

It is found that desirable improvements in thermal conductivity in the direction normal to the plane of a polymeric film is obtained at loadings ranging from ca. 10% to ca. 60% by weight. At loadings higher than 60% by weight, degradation of the properties of the polymer matrix can become excessive, while at loadings less than 10% by weight little improvement is seen in thermal conductivity.

The polymeric composite composition of the present invention is particularly useful as a dielectric or insulating material in electronic devices and wire and cable applications requiring good thermal conductivity in order to provide good cooling.

Example 1

1 g of white hexagonal boron nitride (hBN) platelet particles with an average particle size in the range of 0.1 to 5 μm in thickness and 1-200 μm in the maximum in-plane dimension, as estimated by examination of scanning electron micrographs of the particles, (PT620, Momentive Performance Materials) was spread by hand using a stainless steel glazed finish micro spoon from Bel-Art products onto the rectangular surface of a quartz boat to a depth of approximately 8 mm. The home-made quartz boat was inserted into an EasyTube computer-controlled tube furnace (FirstNano, Ronkonkoma, N.Y.), which was sealed with a PTFE thread sealant tape from Plastomer Technologies. The thus sealed tube furnace was purged at room temperature with nitrogen gas ($N_2$, scientific grade; GTS-Welco, Allentown, Pa.) for 25 min at a flow rate of 1 L/min measured using a model 2179A calibrated electronic flow meter (MKS Instruments, Andover, Mass.). At the end of the purge, the amount of oxygen ($O_2$) in the tube furnace was determined to be 0.1% or less. The partial pressure of oxygen inside the tube furnace was monitored using an RGA (SRS-100) from Stanford Research Systems. The temperature of the tube furnace was ramped to 900° C. in 14 min under $N_2$ at a flow rate of 1 L/min. When 900° C. was reached, the flow of $N_2$ gas was stopped, and hydrogen, methane, and ethylene gases were introduced at flow rates of 1 L/min, 0.500 L/min, and 0.030 L/min, respectively. The sample was soaked in the gas mixture for a period of 2 min, after which the gas flows were stopped, the furnace turned off, and allowed to cool down to room temperature under $N_2$ at a flow rate of 1 L/min for 120 min. The thus produced carbon coated hBN particles are shown in the quartz boat in FIG. 1. The hBN had changed from the white color of the neat hBN to black, indicating that the hBN particles were encapsulated with a turbostratic carbon coating.

Figure 2:
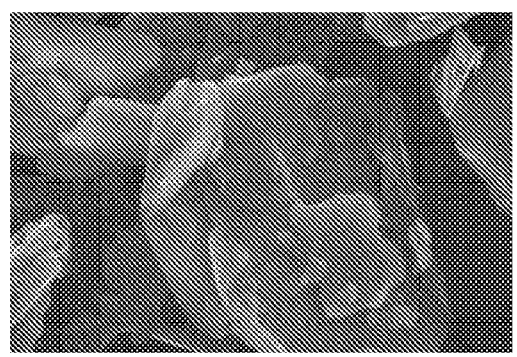
FIG. 2 is a scanning electron micrograph of a turbostratic carbon-coated hBN particle showing complete coverage of a particle surface with the carbon coating.

A scanning electron micrograph (SEM) of the coated hBN particles so produced showed that the platelet structure of the hBN was retained (FIG. 2). A transmission electron micrograph (TEM) of a cross-section of the coated particles showed that the multi-layer turbostratic carbon coating conformed to the shape of and encapsulated the hBN platelet particle. The number of carbon layers which formed the turbostratic structure on the platelets of hBN ranged from 6 to 10 depending upon the specific location examined.

A polyamic acid was prepared from reaction of 100 parts of a diamine known in the art as RODA having the structure:

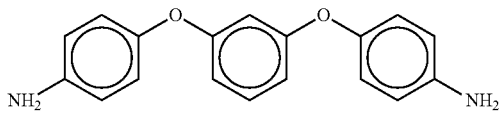

with 80 parts of a dianhydride known in the art as ODPA having the structure

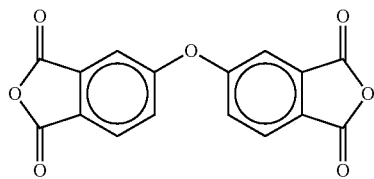

and 20 parts of pyromellitic dianhydride, having the structure

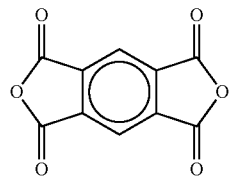

according to Example 4 of U.S. Pat. No. 5,298,331.

2.6 g of the thus synthesized polyamic acid was dissolved in 2.2 g of N,N-dimethylacetamide (DMAC) to form a solution in a glass vial. 0.5 g of the turbostratic carbon coated hBN prepared as described above was dispersed into the solution so prepared by stirring overnight with a Color Squid magnetic stirrer from IKA Works under house vacuum (25 inches of Hg) to form a dispersion. The dispersion so formed was spread on a clean glass plate (7×7 inches) using a two-path wedge gap film applicator from GARDCO having an overall width of 6 inches and a gap of 8 mils to produce a film 50 to 75 μm thick. The thus formed film was first dried in a VWR vacuum oven connected to house vacuum (25 inches of Hg) at 80° C. for 1 hour and then imidized in a box furnace (Barnstead model 6000 Thermolyne) for 30 min at 355° C. in a nitrogen (UHP grade from GTS-Welco) atmosphere. A half inch diameter sample was cut from the thus imidized polymer film. The thermal conductivity normal to the plane of the film was determined using an LFA457 MicroFlash from NETZSCH Instruments. The thus prepared film was found to have a thermal conductivity of 1.022 W/m-° K. A polyimide film of the same composition, but lacking the turbostratic carbon coated hBN, was found to exhibit a thermal conductivity normal to the plane of the film of only 0.2 W/m-° K.

Comparative Example 1

The procedures recited in Example 1 for forming a composite polyimide comprising hBN were followed, but the hBN was used as received and not subject to the coating procedure described in Example 1 prior to incorporation into the polyimide. The thermal conductivity normal to the plane was found to be only 0.574 W/m-° K.

Comparative Example 2

The procedures recited in Example 1 for coating the hBN were followed except that the temperature of the tube furnace was ramped to 750° C. in 11 min and the soak period at 750° C. was 6 min. The thus treated hBN particles were removed from the tube furnace after cooling. No change of color from white to black, as reported in Example 1, had occurred. The color of the powder remained white showing no evidence of carbon deposition on hBN.

Comparative Example 3

The procedures recited in Example 1 for coating the hBN were followed except that (i)1.5 g of hBN were employed, (ii) the volumetric flow rates of $H_2$, methane ($CH_4$) and ethylene ($C_2H_4$) were 1 L/min, 0.500 L/min and 0 L/min, respectively and (iii) the soak period of 2 min at 900° C. was repeated 3 times. Between the 2 min soak periods nitrogen was introduced at a rate of 1 L/min for 10 min. The thus treated hBN particles were removed from the tube furnace after cooling. No change of color from white to black, as reported in Example 1, had occurred. The color of the powder remained white showing no evidence of carbon deposition on hBN.

Example 2

Figure 4:
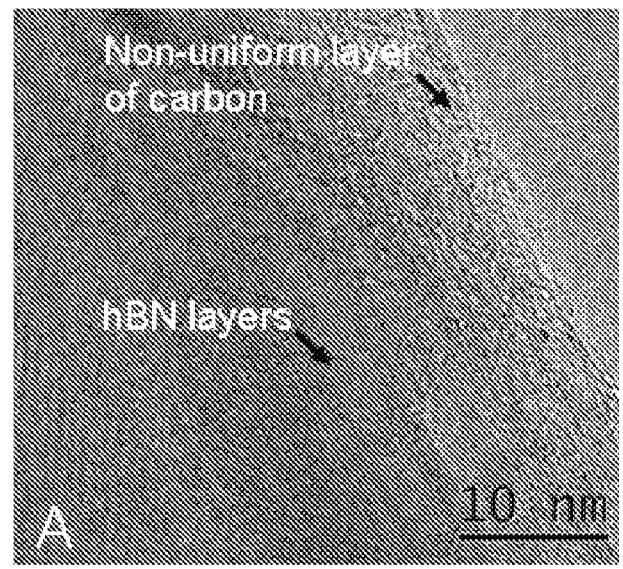
FIG. 4 is a transmission electron micrograph (TEM) of a cross section of a coated hBN particle, showing the distinctive layers of turbostratic carbon making up the coating as prepared according to Example 2.

The procedures recited in Comparative Example 3 were repeated except that the volumetric flow rates of hydrogen, methane, and ethylene were 1 L/min, 0 L/min, and 0.030 L/min. The thus treated hBN particles were removed from the tube furnace after cooling. A change of color from white to black had occurred. Thermo-gravimetric analysis (TGA) of the thus treated hBN revealed a weight decrease of 0.05% at an onset temperature of ca. 600° C., which is characteristic of turbostratic carbon. FIG. 4 is a TEM image of the coated hBN showing the platelet coated with turbostratic carbon.

Example 3

Figure 3:
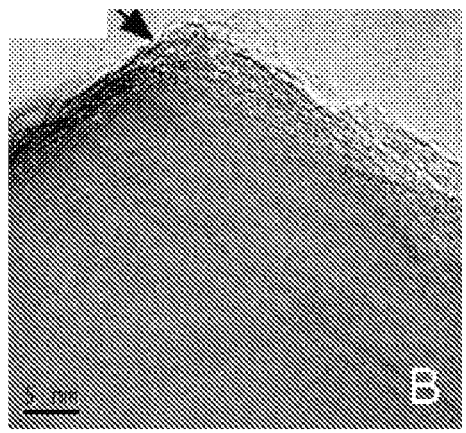
FIG. 3 is a transmission electron micrograph (TEM) of a cross section of a coated hBN particle, showing the distinctive layers of turbostratic carbon making up the coating as prepared according to Example 1.
Figure 5:
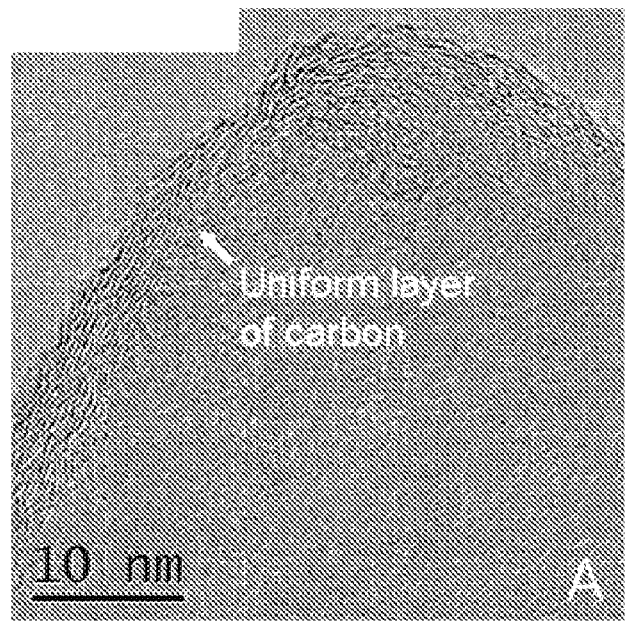
FIG. 5 is a transmission electron micrograph (TEM) of a cross section of a coated hBN particle, showing the distinctive layers of turbostratic carbon making up the coating as prepared according to Example 3.

The procedures recited in Example 2 were followed except the volumetric flow rates of hydrogen, methane, and ethylene were 0 L/min, 0.500 L/min and 0.030 L/min, respectively. The thus treated hBN particles were removed from the tube furnace after cooling. A change of color from white to black had occurred. TGA of the thus coated hBN revealed a decrease of 1.90% in weight at an onset temperature of ca. 600° C. This large weight loss was an indication that the concentration of $H_2$ can be used to control the thickness of the carbon coating. FIG. 5 is a TEM image of the turbostratic carbon-coated hBN produced in accordance with this example. Comparing FIG. 5 with FIG. 3, it can be seen that the coating layer shown in FIG. 5 is generally thicker than that shown in FIG. 3.

Example 4

Figure 6:
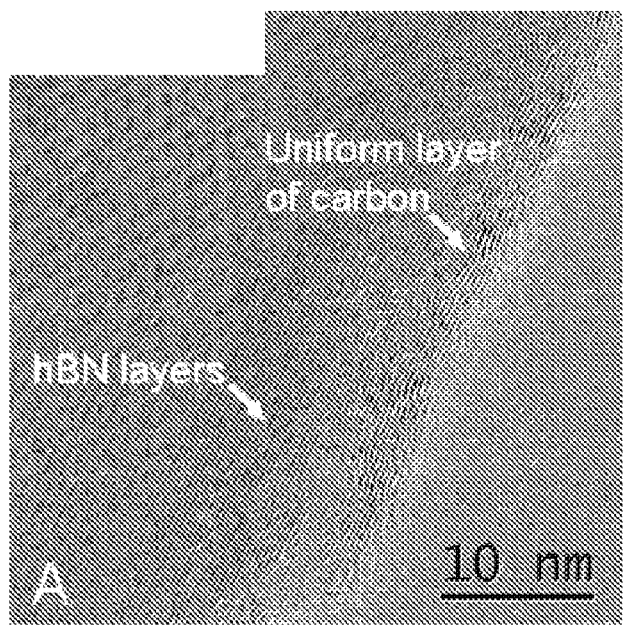
FIG. 6 is a transmission electron micrograph (TEM) of a cross section of a coated hBN particle, showing the distinctive layers of turbostratic carbon making up the coating as prepared according to Example 4.

The procedures recited in Example 2 were followed except that the volumetric flow rates of hydrogen, methane, and ethylene were 1 L/min, 0.500 L/min, and 0.030 L/min, respectively. The thus treated hBN particles were removed from the tube furnace after cooling. A change of color from white to black had occurred. TGA of the thus coated hBN revealed a decrease of 0.74% in weight at an onset temperature of ca. 600° C. FIG. 6 is a TEM image of the turbostratic carbon-coated hBN produced in accordance with this example.

I claim:

1. A polymeric composite composition comprising a polymer having dispersed therein a loading of particles of hexagonal boron nitride having a coating of turbostratic carbon.

2. The composition of claim 1 wherein the hexagonal boron nitride particles are encapsulated by the coating of turbostratic carbon.

3. The composition of claim 1 wherein the coating is characterized by a plurality of layers.

4. The composition of claim 1 wherein the coating ranges in thickness from 5 nm to 5000 nm.

5. The composition of claim 1 wherein the loading is 10% to 60% by weight.

6. The composition of claim 1 wherein the polymer is a polyimide.

7. The composition of claim 1 wherein the hexagonal boron nitride is in the form of platelets characterized by a thickness of 0.1 to 5 micrometers and maximum in-plane dimension of 1 to 200 micrometers.

8. An article comprising a polymer having dispersed therein a loading of particles of hexagonal boron nitride having a coating of turbostratic carbon.

9. The article of claim 8 wherein the hexagonal boron nitride particles are encapsulated by the coating of turbostratic carbon.

10. The article of claim 8 wherein the loading is 10% to 60% by weight.

11. The article of claim 8 wherein the hexagonal boron nitride is in the form of platelets characterized by a thickness of 0.1 to 5 micrometers and maximum in-plane dimension of 1 to 200 micrometers.

12. The article of claim 8 wherein the article is a film.

13. The article of claim 8 wherein the article is an article selected from wire or cable.

14. The article as in of any of the preceding claims 8 through 13 wherein the polymer is a polyimide.

15. A process comprising the steps: dispersing in a solution of a polyamic acid in an organic solvent, particles of hexagonal boron nitride having a coating of turbostratic carbon, casting a film therefrom, extracting said organic solvent, and imidizing said polyamic acid in said film.

* * * * *